United States Patent [19]
Ryll

[11] Patent Number: 5,460,272
[45] Date of Patent: Oct. 24, 1995

[54] APPARATUS FOR SORTING OBJECTS, ESPECIALLY THOSE OF FLAT SHAPE

[75] Inventor: Christoph Ryll, Coesfeld, Germany

[73] Assignee: Ryll GmbH, Gescher, Germany

[21] Appl. No.: 210,808

[22] Filed: Mar. 18, 1994

[30] Foreign Application Priority Data

Mar. 20, 1993 [DE] Germany .......................... 43 09 043.5

[51] Int. Cl.$^6$ ....................................................... B07C 5/00
[52] U.S. Cl. ........................................... 209/583; 209/922
[58] Field of Search ................................... 209/939, 576, 209/577, 583, 922, 923; 198/779, 440, 370

[56] References Cited

U.S. PATENT DOCUMENTS

| | | | |
|---|---|---|---|
| 4,023,673 | 5/1977 | Hansen | 198/370 |
| 4,176,471 | 12/1979 | Vogel | 198/779 |
| 4,792,034 | 12/1988 | Leemkuil | 198/372 |
| 4,953,841 | 9/1990 | Polarek | 209/939 |
| 5,392,927 | 2/1995 | Begemann et al. | 209/583 |

FOREIGN PATENT DOCUMENTS

| | | | |
|---|---|---|---|
| 578859 | 1/1994 | European Pat. Off. | 209/583 |
| 3604562 | 8/1987 | Germany . | |
| 3717736 | 12/1988 | Germany . | |
| 3920417 | 1/1991 | Germany . | |

Primary Examiner—Andres Kashnikow
Assistant Examiner—Lisa Douglas
Attorney, Agent, or Firm—Karl F. Milde, Jr.

[57] ABSTRACT

In order for an apparatus for the sorting of objects, especially those of flat shape, to permit a simple and horizontal distribution of the objects, an endlessly circulating primary roller conveyor (2) is divided into roller sections (3.1, . . . ) of rollers (7.1.1, . . . , 7.1.n, 7.n.1, . . . 7.n.n) arranged in groups with window sections (5.1, . . . ) as gaps between them. Underneath the upper conveyor plane (upper run 2.1) and the lower return plane (lower run 2.2), secondary conveyors (11.1, . . . , 12.1, . . . ) are disposed in the intermediate space (2.3) of the roller conveyor (2). Roll-off systems (6.1, . . . ) are associated with the secondary conveyors, which, when operated by a control system, contact the rollers (7.1.1, . . . , 7.1.n, . . . , 7.n.1, . . . 7.n.n) of a roller section (3.1, . . . ), so that the object (4.1, . . . ) lying thereon is rolled away against the direction of movement of the roller conveyor (2) and falls through the window section (5.1, . . . ) behind it onto the secondary conveyor lying under this window section (5.1, . . . ). By means of this flat-and-gap distribution the objects can drop immediately out of the upper run (2.1) onto the secondary conveyors (11.1, . . . , 12.1, . . . ). The rolling of the objects (4.1, . . . ) backward into the gap configured as a window section insures such that the objects (4.1, . . . ) are deposited almost horizontally onto the secondary conveyors (11.1, . . . , 12.1, . . . ) lying beneath it.

6 Claims, 1 Drawing Sheet

APPARATUS FOR SORTING OBJECTS, ESPECIALLY THOSE OF FLAT SHAPE

BACKGROUND OF THE INVENTION

The invention relates to an apparatus for sorting objects, especially those of flat shape, such as periodicals, compact disks or the like. The apparatus includes a primary conveyor which has gaps and on which objects can be placed, a plurality of secondary conveyors which are disposed underneath the gaps, and a control system which causes the distribution of the objects to one of the secondary conveyors with the aid of image recognition.

The German Patent No. 39 20 417 A1 discloses a sorting unit for flat cuttings. It consists of three conveyor paths running in tandem. Between the first and the second, and the second and the third conveyor paths is disposed a sorting switch. The sorting switches have switch bodies in the form of an acute wedge shape which point against the direction of conveyance. If the wedge points to the adjacent conveyor path, the objects pass over it to the next one. If the wedge rises up, however, the objects drop onto a conveyor path running below it.

A disadvantage of this sorting unit is that the system consists of a plurality of individual running conveyor paths. The sorting switches between them can perform their function only when the conveyor path is substantially longer than the length of the objects to be sorted. Thus the apparatus is very long and complicated and any simple and properly positioned sorting of the objects is not permitted.

Another German Patent No. 36 04 562 A1 discloses a sorting apparatus which consists of a main conveyor and a plurality of sorting conveyors. A switch is disposed, at the point at which the sorting conveyors run from the main conveyor, which switch consists of rolls disposed side by side, which can be turned in and out and driven.

In order to be able nevertheless to distribute or sort objects the switch must be actuated so that the objects can be steered straight or turned left or right on an equal level.

In the U.S. Pat. No. 4,792,034 there is described a sorting apparatus which consists of a main conveyor and sorting conveyors in which switching rolls are disposed on a flap switch to the sorting conveyor. In order to steer an object from the main conveyor to the sorting conveyor, the flap switch, and with it the switching roll, must be switched, requiring a great amount of time and power, so that such a system is slow and suitable only for heavy objects.

The German Patent No. 37 17 736 discloses a transport system which consists of a covered belt run with conveyor belts which are guided over conveyor rolls. Between the transport belts are disposed switches which are controlled by a coding system.

To be able to sort objects, here again several conveyor belts and separate switches are necessary. Also, a system of this kind, which is designed for sorting letters, is not suitable for the sorting of magazines. Since individual magazines have to be placed upright in the transport system, they may open when they are turned out of the switches, so that their position changes and they cannot be deposited perfectly.

Magazines which could not be sold after their appearance date must be sent back to the particular publisher for credit. To do so, it is necessary to sort these magazines by title and publisher. It is known in this case to transport the magazines in line on a belt. Beside the belt, pushing systems are disposed at corresponding stations. If one of the magazines is recognized to be associated with one of the stations, the pusher moves across the belt and pushes the magazine off. It is disadvantageous in this case that, when the magazine is laterally pushed off, the magazine can be skewed or displaced by the continued running of the belt. Stacking in correct position and proper bundling is thus possible only with great difficulty. Furthermore, the running belt can be damaged or a pushing beyond the belt can be caused by the pushing system, leading to additional complications.

SUMMARY OF THE INVENTION

The principal objects of the present invention are to eliminate the above-described disadvantages in the sorting of objects, especially those of flat shape, and to create an apparatus for the sorting of objects, especially flat objects, such as magazines, compact disks or the like, which permits a simple and properly oriented distribution of the articles while eliminating unnecessary operations.

These objects, as well as other objects which will become apparent from the discussion that follows, are achieved, according to the invention, by providing the following improvements:

(1) The primary conveyor is a continuously running roller conveyor which is subdivided into roll sections of rolls disposed in groups with gaps between them configured as window sections.

(2) Each of the secondary conveyors is disposed beneath the lower plane of the top horizontal run of the roller conveyor and above the bottom return plane thereof; that is, in the middle of the roller conveyor.

(3) Roll-off systems are associated with the secondary conveyors, which, when actuated by the control system, make contact with the rollers of one of the roller sections, so that the object lying thereon rolls contrary to the direction of movement of the roller conveyor and drops through the window section behind it onto the secondary conveyor system situated below this window section.

The advantages achieved by the invention consist especially in the fact that, by means of the division of the roller conveyor or belt into flats and gaps, the magazines drop immediately from the upper belt run onto the secondary conveyor. The reverse rolling off of the magazines into a gap configured as a window section provides for depositing the objects nearly horizontally into the gap and onto the secondary conveyors in the space within the roller conveyor. In this kind of sorting no skewing and shifting of the objects can occur. Thus this flat-and-gap process is suitable for sorting not only flat objects, such as magazines, compact disks or the like, but also to the sorting of packaged or canned foods, such as sausage packages, canned vegetables and fruits and the like. Also fragile articles, such as glasses, etc., can be distributed by this very gentle sorting process.

Advantageously, the roller conveyor runs at a substantially uniform velocity. This uniform velocity substantially facilitates the placement of objects onto the roller conveyor. It is, of course, also possible for the roller conveyor to move step by step or at different accelerations between steps. Objects are rolled off of the roller sections against the direction of movement of the roller conveyor. In contrast to the simple pushing off of the objects an additional off-sweeping movement occurs. Thus it is possible to lay the objects, especially magazines, through the window sections and onto the secondary conveyors below very rapidly and, above all, in correct positions.

It is advantageous if the objects are placed in the correct orientation onto the roller sections, e.g., with a legend up in position for reading. This is made possible in a very simple manner by the fact that first a scan is performed, and the object is brought to the position necessary for later packing. Thus uniformly shaped package units are formed. This is especially advantageous whenever later reuse is intended. If, for example, certain compact disks are to be resold elsewhere, a packaging corresponding to an original packaging is achieved.

It is advantageous if the roller sections consist of rollers arranged in groups. In this manner it is possible to match the roller section to the particular size of the objects to be sorted. If, for example, only cans are to be sorted, fewer rollers are needed than when it is a question of sorting publications of DIN A 4 size or standard letter size. The rollers arranged in groups are then held side by side by longitudinal members such as chains, cables or the like, leaving the window gaps open in the circulating roller conveyor, within pairs of guiding rails top and bottom, which are substantially parallel to one another. This assures that the individual rollers of the roller sections will move parallel to one another in the direction of movement.

Advantageously the rollers consist of a rigid shaft fixedly joined to the chains, cables or the like, and at least one hollow cylinder moving freely and rotatably around it. The rollers can be configured differently according to the particular conditions of use. It is possible to arrange partial cylindrical bodies lying side by side on one shaft. It is of course also possible to mount a single hollow cylinder on the shaft, which can rotate in ball bearings around the rigid shaft. This assures that while the objects are being carried on the roller sections they will lie motionless on them and will not be able to be dropped until the roll-off systems are actuated.

The roll-off systems consist of a rod of about one length of the window section. In any case it must be assured that the individual rollers will be moved so that the object will be able to be rolled off in its flat shape into the window section from the particular roller section.

The roll-off systems are advantageously disposed on at least one of the outside areas of the transport system. The roll-off systems can be disposed above, below or beside the rollers of the particular roller section, so that when an actuating impulse occurs contact with the individual rolls of the roller section is assured. It is, of course, also possible to position the roll-off system on one of the two outer sides of the roller conveyor, or also in the middle from below.

Advantageously the secondary conveyors comprise a conveyor belt and at least one receiving system disposed at one of the extremities of the conveyor belt. It is also possible, of course, for the receiving systems to be disposed on both sides of the particular conveyor belt. In this manner it is possible to pick up the objects in correct position and form so that they can be packed in the same correct position after they are stacked.

In this connection it has proven desirable to dispose the conveyor belts offset at an angle between 10° and 170° from the direction of movement of the roller conveyor underneath the upper pair of guide rails. The oncoming objects can thus be distributed quickly and securely in various directions. Arrangement directly under the window sections assures a rapid depositing in the correct position on the conveyor belt, so that in no way can any skewing or shifting of the object occur.

It is advantageous to suspend the conveyor belts from the upper pair of guide rails at an angle from the horizontal. This canting of the conveyor belts can be performed in alternation from the conveyor belt motor or some other point of reference. The suspension can be done with chains, straps or continuous walls. On the lower side at least one abutment strip or the like is provided in the area of the window section of each conveyor belt. This abutment assures that the objects coming from the window section will be already prealigned on one side and need only be stacked one on the other or side by side in the particular receiving system. In this manner, stacks and bundles are packed so orderly that then all they need is to be wrapped in a plastic wrapping, for example.

For a full understanding of the present invention, reference should now be made to the following detailed description of the preferred embodiments of the invention as illustrated in the accompanying drawings.

DESCRIPTION OF THE PREFERRED EMBODIMENT

Figure 1:
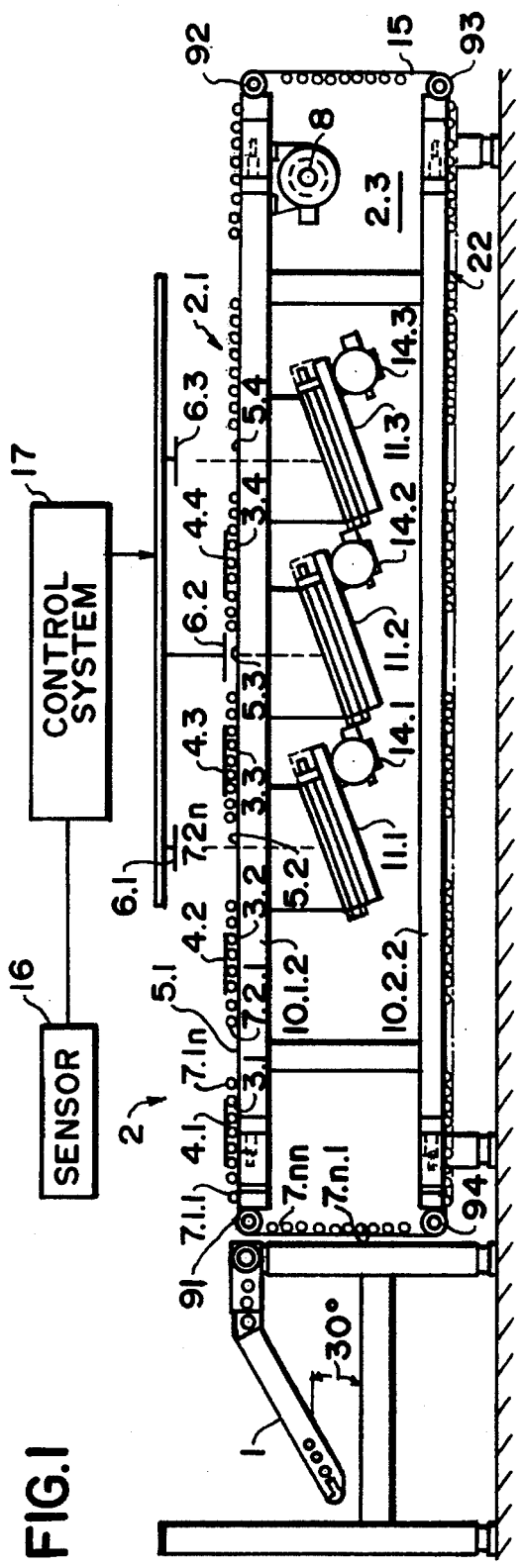
FIG. 1 is a schematic side view of an apparatus for sorting objects, especially flat objects such as magazines.

The preferred embodiment of the present invention will now be described with reference to FIGS. 1–2 of the drawing. Identical elements in these two figures are designated with the same reference numerals.

Figure 2:
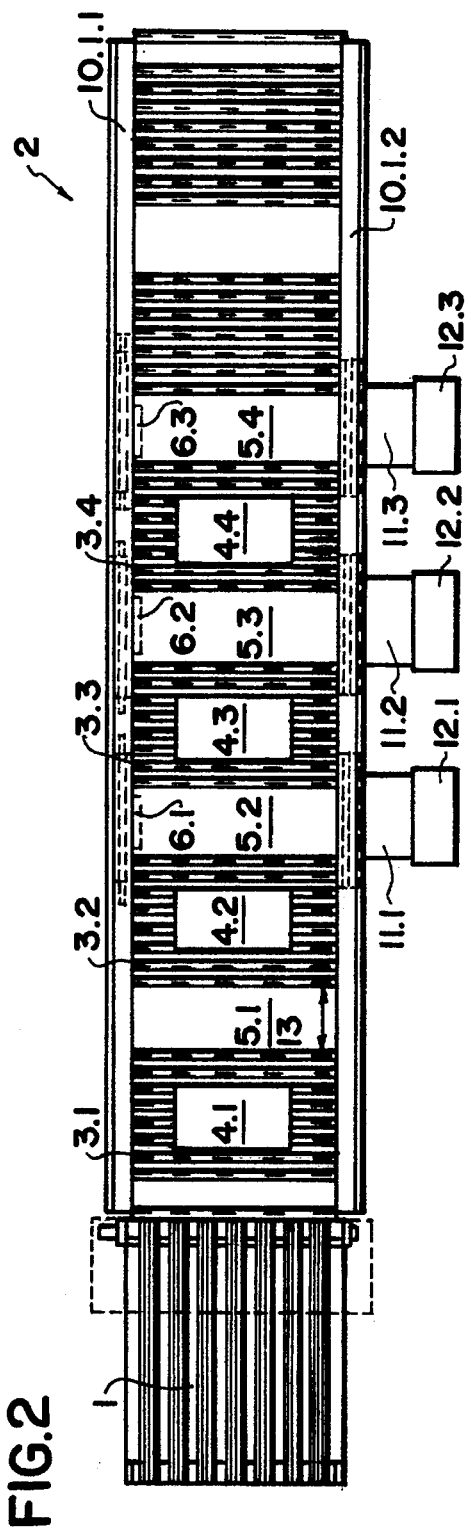
FIG. 2 is a schematic top view of the apparatus according to FIG. 1.

The preferred embodiment of sorting apparatus according to the invention comprises a feeder 1 and a circulating roller conveyor 2 as shown in FIGS. 1 and 2. It is important to the invention that the roller conveyor 2 be subdivided into roller sections 3.1, 3.2, 3.3, 3.4, etc., between which window sections or gaps 5.1, 5.2, 5.3, 5.4 etc. are located. The roller section 3.1 consists of individual rollers 7.1.1, . . . 7.1.n, roller section 3.2 of individual rollers 7.2.1, . . . 7.2.n, and the last roller section of rollers 7.n.1 . . . 7.n.n. The number of rollers 7.1.1, . . . 7.n.n in the individual roller sections 3.1, etc. is to be adapted to the size of the objects 4.1, . . . . . The individual rollers 7.1, . . . 7.n consist of shafts running through them, around which a hollow cylinder is rotatably mounted. It is, of course, also possible to arrange individual rollers side by side on the shaft. The shafts are fastened on both sides to longitudinal members 15, such as chains or cables, and run around rollers 9.1, 9.2, 9.3 and 9.4 at the beginning and the end of the roller conveyor in the upper run 2.1 in upper guide rails and in the lower run 2.2 in lower guide rails 10.1.1, 10.1.2 of the frame of the roller conveyor 2. The fastening of the individual rollers 7.1.1., . . . 7.n.n to the chains or cables results in the formation of roller sections 3.1, . . . and by non-fastening the window sections 5.1, . . . with a corresponding length 13. This length 13 is selected such that the object, e.g., in the form of a newspaper, passes through the window section 5.1. Roll-off roll systems 6.1, 6.2 and 6.3 are disposed above the roller conveyor 2. Of course, it is also possible to mount these roll-off rolls beside, below and/or on both sides of the roller conveyor 2.

Furthermore, it is important for the invention for conveyor belts 11.1, 11.2 and 11.3 to be inserted into a space 2.3 between the upper run and lower run of the conveyor belts 11.1, 11.2 and 11.3. They are hung beneath the window sections 5.1, 5.3 and 5.4 from the upper pair of guide rails 10.1.1 and 10.1.2. These conveyor belts 11.1, . . . are canted. They are driven by conveyor belt motors 14.1, 14.2 and 14.3. At their one end receiving systems 12.1, 12.2 and 12.3 are disposed. It is also possible to position these receiving systems on both sides of the conveyor belts. The conveyor belts in that case can be disposed at an angle between 10° and 170°. As it can be seen especially in FIG. 2, they are preferably disposed at a right angle.

For the sorting and distribution of magazines 4.1, . . . the roller sections 3.1, . . . are formed in the appropriate width, and the window sections 5.1, . . . in the length 13. It is advantageous if the width of the roller sections 3.1, . . . is greater than any of the window sections. Then the roller conveyor 2 is tensed, the conveyor belts 11.1, . . . 11.3 tilted so that they can cooperate with the corresponding receiving system 12.1, . . . 12.3. When the motor 8 is started, the circulating roller conveyor 2 moves. Magazines 4.1, . . . are placed on the feeder 1, which can be tilted on a pivot accordingly. This placement is performed such that the magazines are all deposited uniformly, e.g., with the heading up, on the roller sections 3.1, . . . . Directly above the roller section 3.1 is disposed a sensor 16 for recognizing the particular magazine. The recognition pattern is fed to a control system 17, which controls the roll-off system 6.1 . . . 6.3. For example, if the magazine 4.1 reaches the roll-off 6.2 the latter is actuated. The roll-off system 6.2 shifts downwardly and contact the rollers of roller section 3.3. Since the outer cylinders on which the magazine 4.3 lay immobile until then are journaled in the inside axis, the rollers of roller section 3.3 move contrary to the direction of advance of the roller conveyor 2. In this manner the magazine 4.3 is rolled back and thus drops into the window section 5.2 behind it. The rolling backward movement of the magazine 4.3 places the latter in the proper position on the conveyor belt 11.2 situated beneath it. It is important that the length and the position of the roll-off roll system with respect to the window section 5.2 are selected such that the magazine 4.3 can fall through the window section 5.2 onto the conveyor belt 11.2 lying canted beneath it. Due to the fact that the conveyor belts 11.1, . . . are defined, at least in the area of the window sections 5.2, . . . by unilateral rails, continuous walls or the like, the magazine 4.3 rests against this unilateral abutment. This assures that, right when the magazine 4.3 is deposited on the conveyor belt 11.1, it is positioned such that the magazines that follow will be deposited only stacked one on the other in the receiving system 12.2 when the conveyor belt motor is running.

If receiving systems are on both sides of the conveyor belt 11.2, it is possible to drop different magazines over the same window section 5.2 with the same roll-off system 6.2 by changing the direction of movement of the conveyor belt 11.2. If the magazines 4.1 . . . are different magazines, then after they have been recognized by the sensor 16 and control system 17, they can of course be deposited simultaneously onto the conveyor belts 11.1, . . . situated under the window sections 5.1, . . . and transported accordingly into the receiving systems 12.1, . . . . Thus the sorting apparatus according to the invention is capable of sorting at a high speed a plurality of widely different magazines neatly and in the correct position.

There has thus been shown and described a novel apparatus for sorting objects, especially those of flat shape, which fulfills all the objects and advantages sought therefor. Many changes, modifications, variations and other uses and applications of the subject invention will, however, become apparent to those skilled in the art after considering this specification and the accompanying drawing which disclose the preferred embodiment thereof. All such changes, modifications, variations and other uses and applications which do not depart from the spirit and scope of the invention are deemed to be covered by the invention, which is to be limited only by the claims which follow.

What is claimed is:

1. In an apparatus for sorting objects, said apparatus comprising:
    (a) a primary conveyor on which objects can be placed and having a plurality of gaps for objects to fall through;
    (b) a plurality of secondary conveyors disposed beneath the gaps; and
    (c) a control system which, on the basis of image recognition, causes a distribution of the objects to one of the secondary conveyors;
    the improvement wherein the primary conveyor is a continuously circulating roller conveyor which is subdivided into roller sections of grouped rollers with gaps configured as window sections arranged between them, said roller conveyor moving substantially horizontally in a first plane and returning substantially horizontally in a second plane;
    wherein each of the secondary conveyors is disposed between the first plane and second plane in the inner space of the roller conveyor; and
    wherein roll-off means are associated with the secondary conveyors which are actuated by the control system to contact the rollers of one of the roller sections so that the object lying thereon rolls against the direction of movement of the roller conveyor and drops through the window section behind it onto a secondary conveyor system lying under this window section.

2. The apparatus according to claim 1, wherein the roller conveyor has a substantially uniform rotary speed.

3. The apparatus according to claim 1, wherein the rollers arranged in groups in the roller conveyor are held side by side leaving free the window sections between them and are guided in upper and lower guiding pairs lying substantially parallel to one another.

4. The apparatus according to claim 1, wherein the roller conveyor comprises two flexible longitudinal members with the rollers extending between them and wherein the rollers comprise a rigid shaft fixedly joined to the longitudinal members and at least one hollow cylinder freely and rotatably movable around the shaft.

5. The apparatus according to claim 1, wherein the roll-off means comprise a rod of approximately a length of the window section.

6. The apparatus according to claim 1, wherein the roll-off means are disposed in at least one of the outside areas of the roller conveyor.

* * * * *